(12) United States Patent
Henderson

(10) Patent No.: US 11,742,122 B1
(45) Date of Patent: Aug. 29, 2023

(54) THREE PHASE FRACTAL GENERATOR SYSTEM AND METHOD OF USE

(71) Applicant: David Clayton Henderson, Louisville, KY (US)

(72) Inventor: David Clayton Henderson, Louisville, KY (US)

( * ) Notice: Subject to any disclaimer, the term of this patent is extended or adjusted under 35 U.S.C. 154(b) by 0 days.

(21) Appl. No.: 17/511,229

(22) Filed: Oct. 26, 2021

Related U.S. Application Data

(60) Provisional application No. 63/105,341, filed on Oct. 25, 2020.

(51) Int. Cl.
  *H02K 21/24* (2006.01)
  *H01F 7/02* (2006.01)
  *H01F 3/06* (2006.01)

(52) U.S. Cl.
  CPC ............. *H01F 7/0242* (2013.01); *H01F 3/06* (2013.01); *H02K 21/24* (2013.01)

(58) Field of Classification Search
  CPC ..................................................... H02K 21/24
  See application file for complete search history.

(56) References Cited

FOREIGN PATENT DOCUMENTS

CN          111277094 A  *  6/2020  ............. H02K 21/24

* cited by examiner

*Primary Examiner* — Ramon M Barrera
(74) *Attorney, Agent, or Firm* — Leavitt Eldredge Law Firm

(57) ABSTRACT

A three phase fractal generator system includes an armature plate, having a first conductor winding having nine fractal circles wrapped in wire; a second conductor winding having nine fractal circles wrapped in wire; and a third conductor winding having nine fractal circles wrapped in wire; a fractal field relay positioned on top of the armature plate, the fractal field relay having, an inner, middle, and outer circular row of magnets; each magnet is flanked by a magnet with an opposite pole; and a position and proximity of each of the magnets in the fractal field relay create a compressed woven magnetic field that reduces bleed off while channeling a peak strength to the armature plate and spins relative to the armature plate.

5 Claims, 7 Drawing Sheets

THREE PHASE FRACTAL GENERATOR SYSTEM AND METHOD OF USE

BACKGROUND

1. Field of the Invention

The present invention relates generally to generator systems, and more specifically, to a three-phase fractal generator system wherein electricity is conducted by rotating a fractal field relay above a fractal armature.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
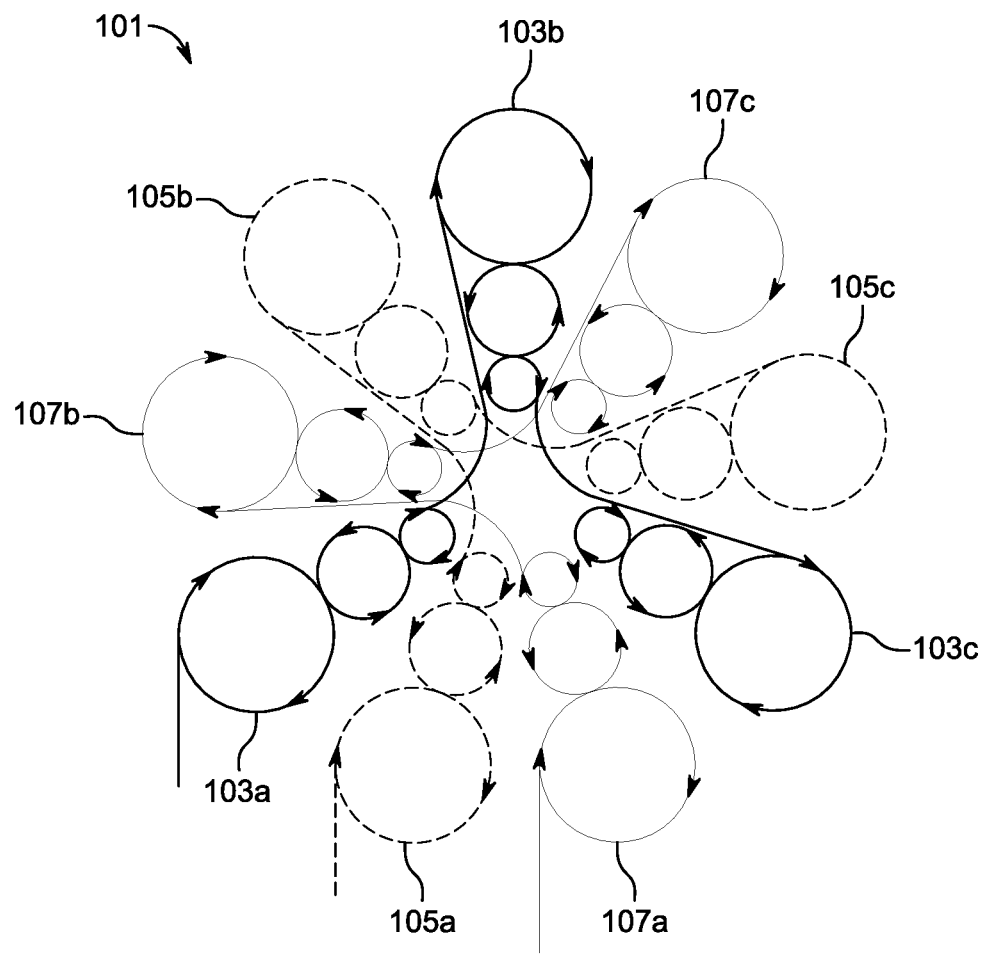
FIG. 1 is a top view of an armature plate in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-7 depict various views of a three-phase fractal generator system in accordance with the present application.

Figure 6:
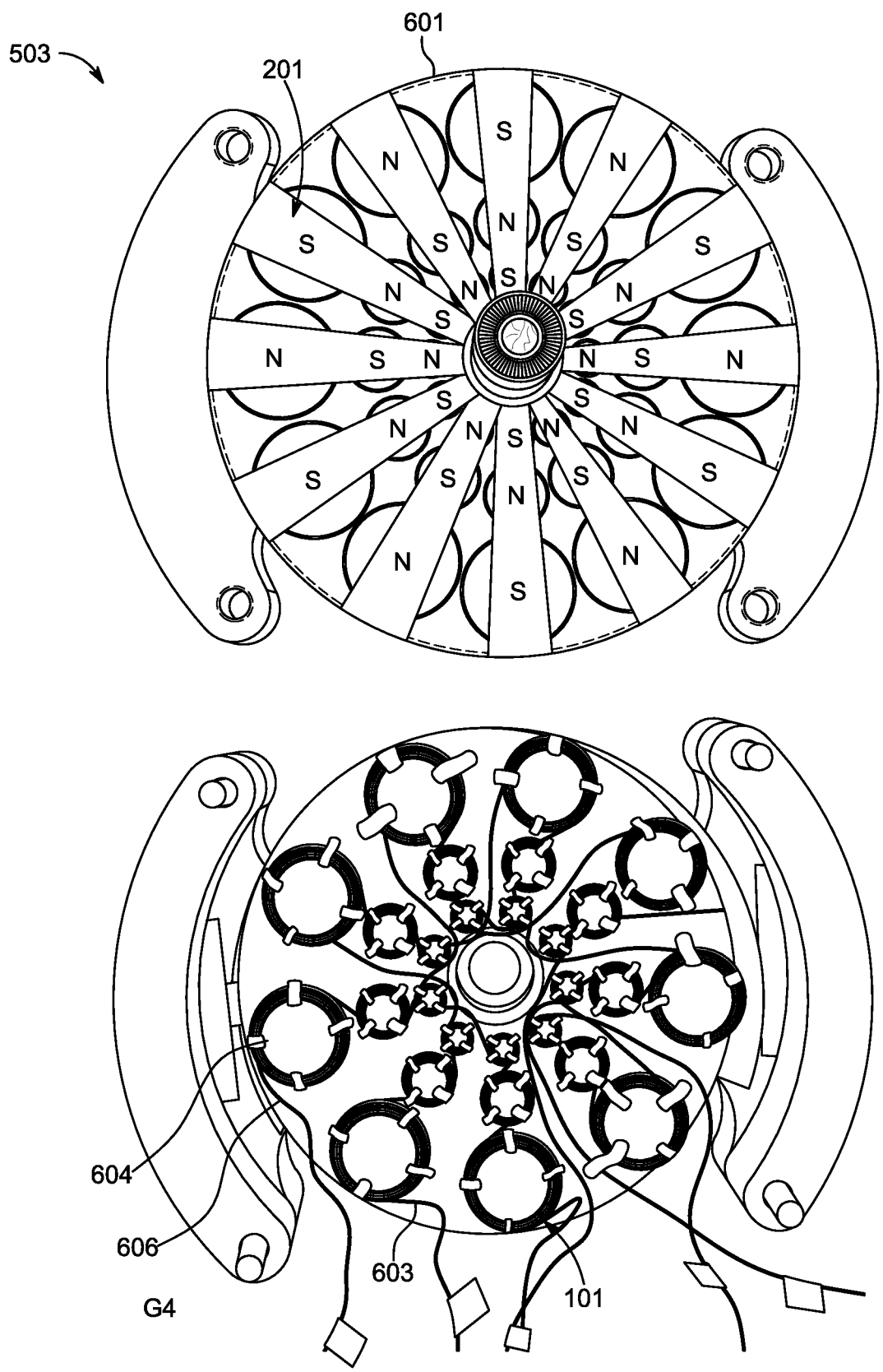
FIG. 6 is a top view of a field relay and armature of FIG. 6.
Figure 7:
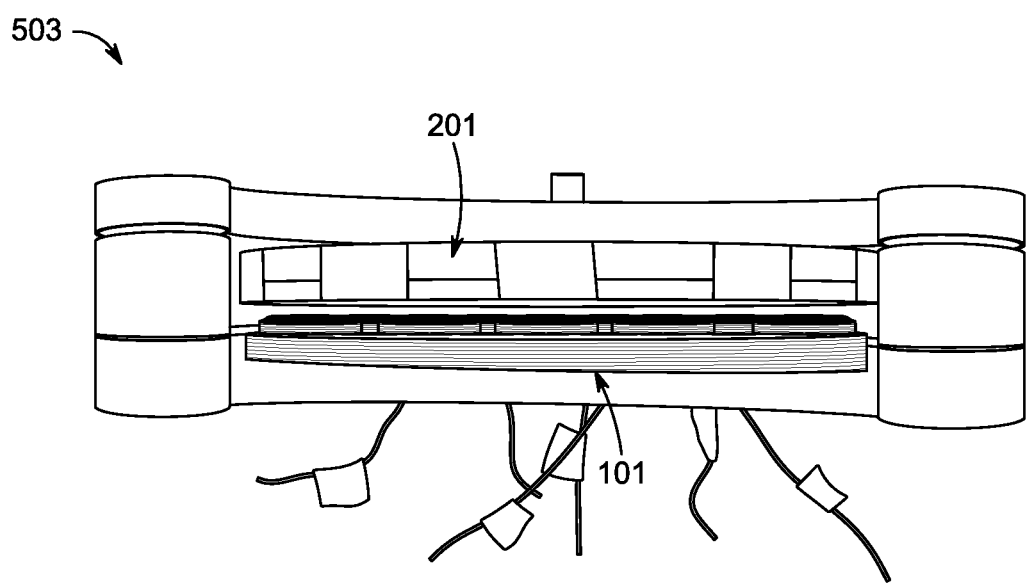
FIG. 7 is a side view of a fractal generator in accordance with the present application.

In FIG. 1, a top view of an armature plate 101 is shown in accordance with the present application is shown. The armature consists of three conductor windings 103a-c, 105a-c, 107a-c, that each have nine fractal circles that change magnetic field directions 108 times per rotation as shown. The three conductor windings are spaced 120 degrees apart to produce a constant 3 phase electromagnetic field. The Fractal armature as a whole changes magnetic field directions 324 times per rotation. As best shown in FIG. 6, each circle (example 604) is wrapped 36 times using 26 Awg wire (example 606). The Armature plate windings are the same size as the magnets in the Field Relay but are 3/16 thick where the field relay is 1/8 thick. The material the windings are wrapped around is non-magnetic. Unlike traditional armatures there is no metal aside from that of the windings. This is done to reduce the strength of the EMF produced by the current in the armature.

Figure 2:
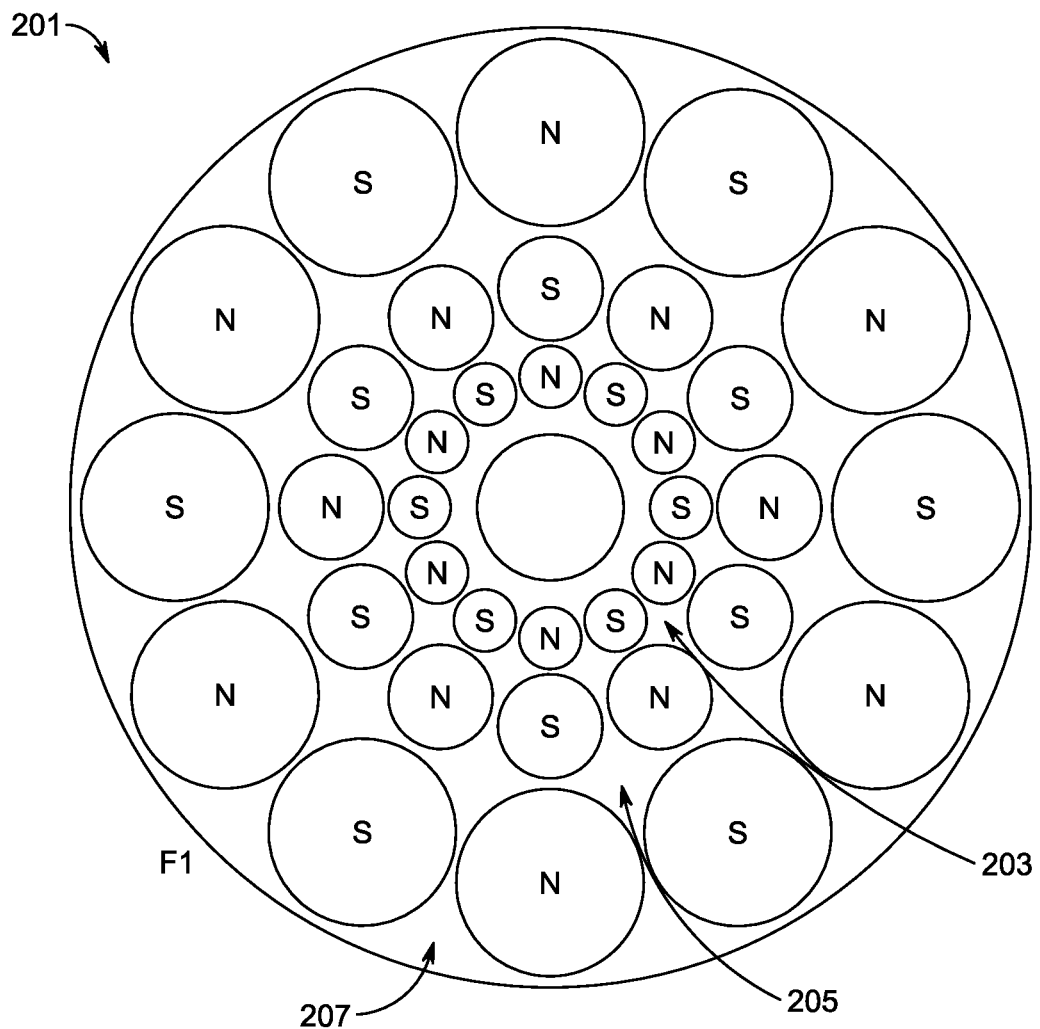
FIG. 2 is a view of a fractal field relay with field directions.

In FIG. 2, a fractal field relay 201 with corresponding directional indicators is shown, which pairs to the armature plate 101. As shown, the relay 201 consists of 36 magnets arranged in 3 circular rows and secured in a non-magnetic material (see FIG. 6). The inner row 203 has 12, 3/8×1/8 N42 magnets. The middle row 205 has 12, 5/8×18 N42 magnets. The outer row 207 has 12, 1 1/8×1/8 N42 Magnets. Each magnet is flanked by a magnet with an opposite pole as shown in FIG. 2. The design creates a compressed woven magnetic field that reduces magnetic field bleed off.

In some embodiments, a dc motor using a 1.5V battery was used to spin the Fractal Field relay, however it should be appreciated that alternative embodiments may be utilized.

Figure 3:
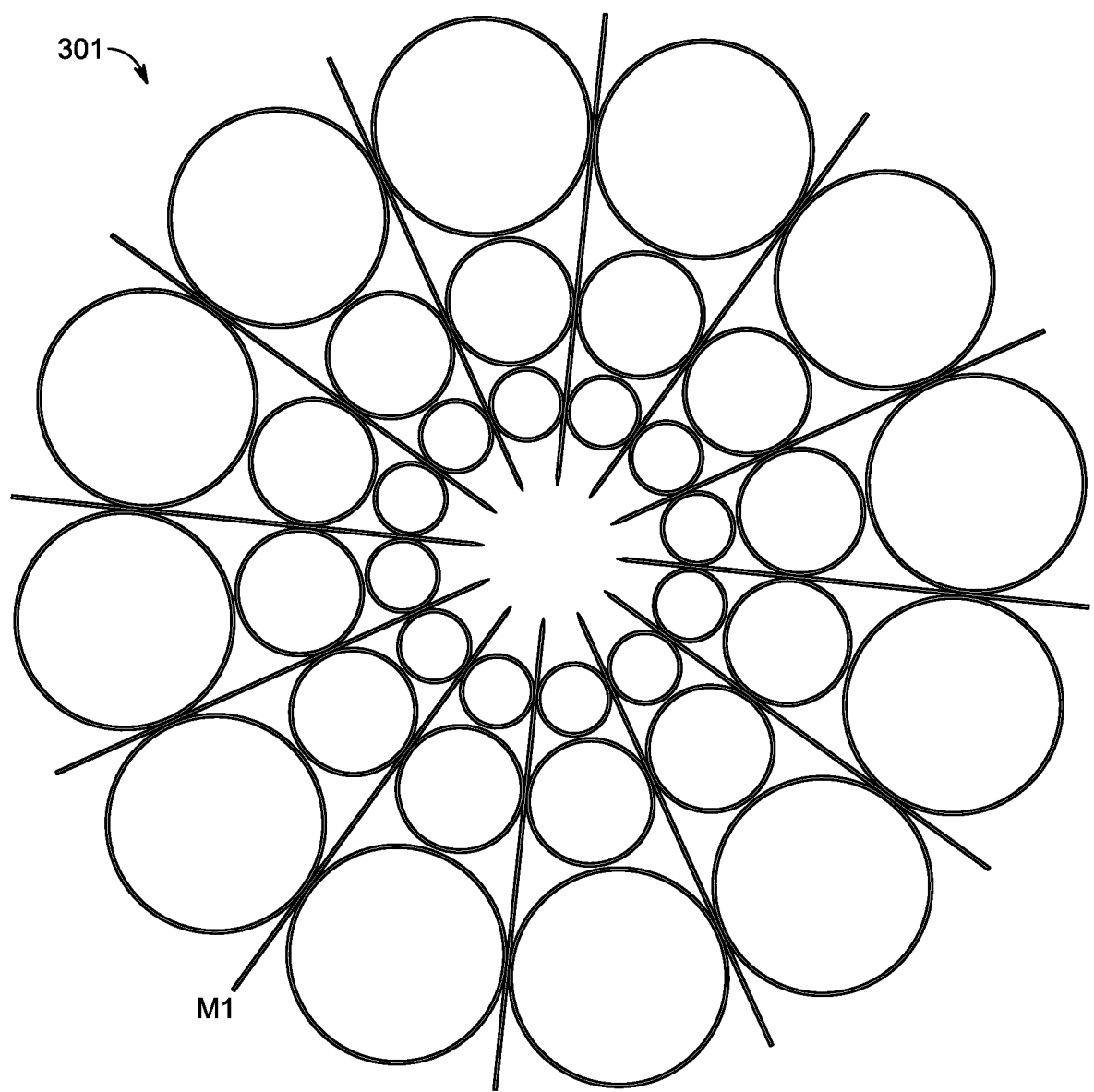
FIG. 3 is a view of a field relay mag field.

In FIG. 3, a magnetic field 301 is shown corresponding to the fractal field relay 201 as discussed above.

Figure 4:
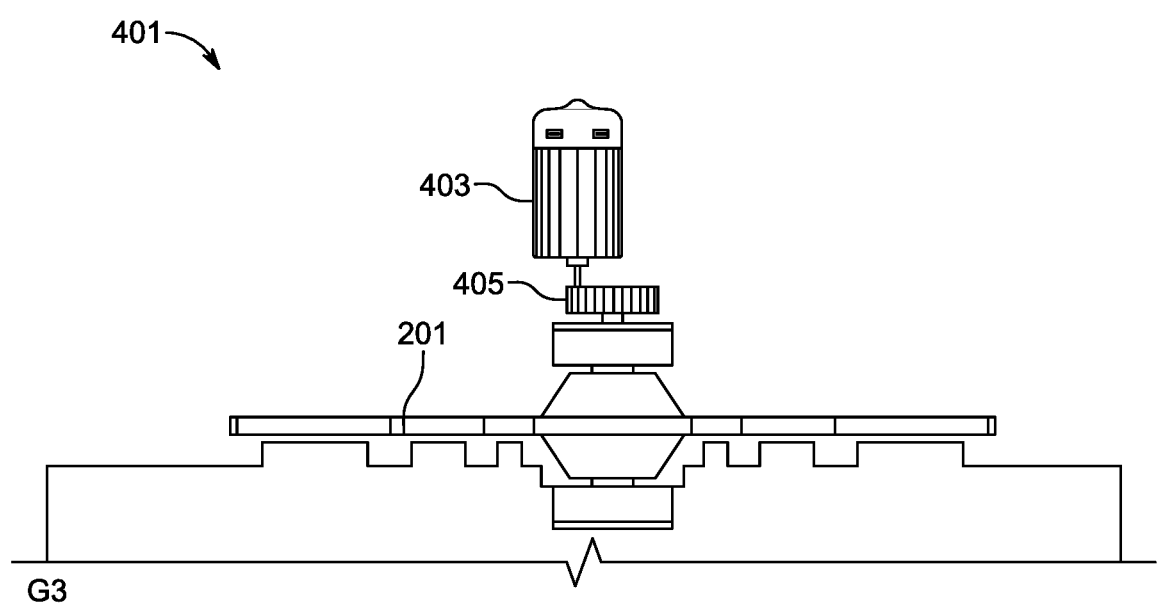
FIG. 4 is a side view of a fractal generator in accordance with the present application.

In FIG. 4, a fractal generator system 401 in accordance with the present invention is shown. As shown, the generator system 401 utilizes a test motor 403 which as discussed above can be interchangeable, the motor 403 connected to one or more gears 405 further connected to the fractal field relay 201, wherein the motor and gears are used to spin the fractal field relay 201.

Figure 5:
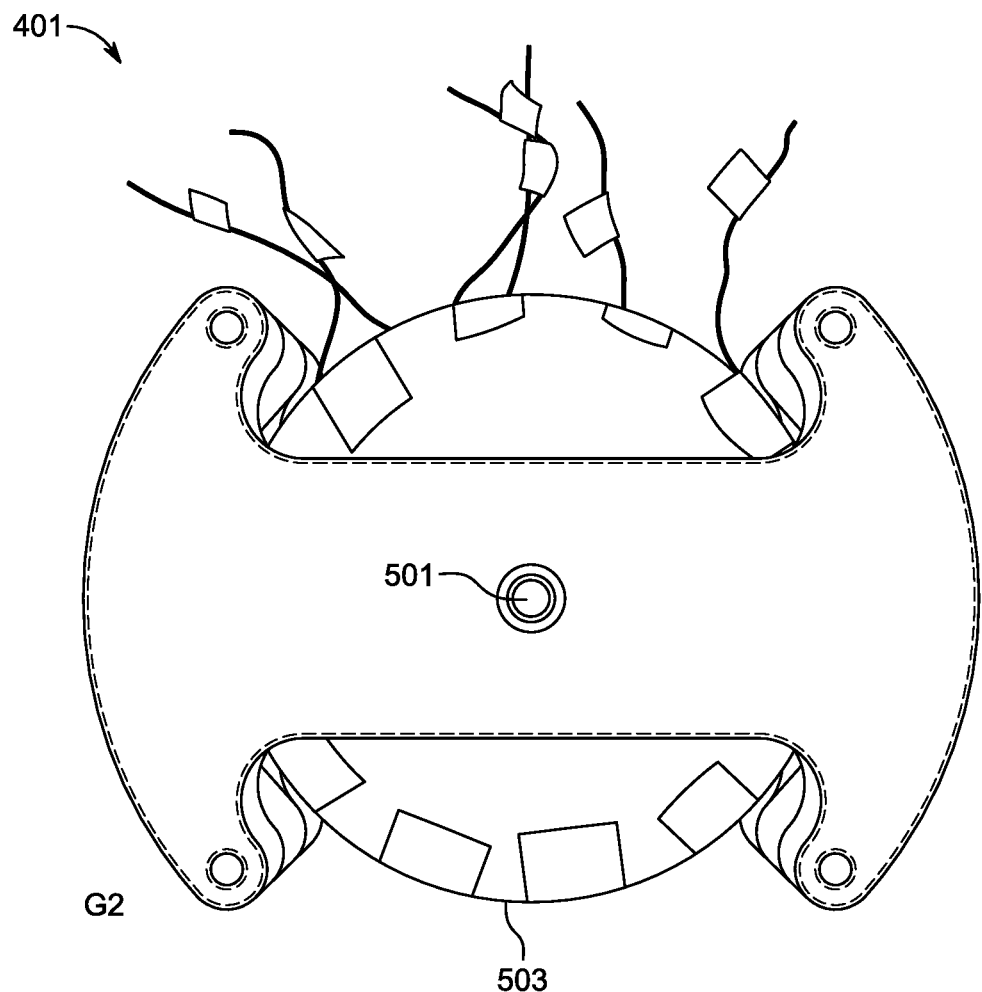
FIG. 5 is a top view of the fractal generator of the present application.

In FIG. 5, a top view of the fractal generator system 401 is shown, wherein the system 401 includes an attachment 501 for connecting to the motor shown in FIG. 4. Further shown is a housing 503 which is composed of a non-magnetic material and houses the armature plate 101 therein along with the plurality of magnets that make up the fractal field relay 201 as discussed above.

Further, as shown in FIG. 6, the housing 503 includes a top portion 601 removable from a bottom portion 603. As shown, the bottom portion houses the armature plate 101 with the three windings as discussed above. Further, the top portion 601 houses the plurality of magnets that make up the fractal field relay 201 as discussed above. Lastly, in FIG. 7, a side view further depicts these features, wherein the fractal field relay 201 and the armature plate 101 are sandwiched together.

One of the unique features believed characteristic of the present invention is that the position and proximity of the permanent magnets in the field relay create a compressed woven magnetic field that reduces bleed off while channeling the peak strength to the conducting coil positions. The fractal nature of the armature plate allows the conducting coils to cross alternating poles with higher frequency per rotation. Furthermore, the fractal design crates a compact system with the main components combined only measuring 0.75" thick.

It should be appreciated that additional future embodiments are contemplated, such as (1) Changing from 36 wraps using 26 Awg wire at 2.1 ohms to 16 wraps using 22 Awg wire at reduces the resistance to 0.5 ohms; (2) Changing the orientation of the wraps from alternating clockwise/counter clockwise to vertical wraps over and under around a 1/16"flap of non-magnetic material positioned in the same size circles to eliminate the need for the electron flow to move against the rotation of the field relay as it rotates around the coils. In essence "milking" the electrons in the wire; (3) Placing an addition Armature Plate above the Field Relay to double the conduction; and (4) The size of the fractal structure should not be limited to the size shown but could be scaled up or down dependent upon design output needs.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A three phase generator system, comprising:
   an armature plate, having:
      a first conductor winding having nine circles wrapped in wire;
      a second conductor winding having nine circles wrapped in wire; and
      a third conductor winding having nine circles wrapped in wire;
   a field relay positioned on top of the armature plate, the field relay having:
      an inner circular row of magnets;
      a middle circular row of magnets surrounding the inner circular row of magnets; and
      an outer circular row of magnets surrounding the middle circular row of magnets;
   wherein each magnet of the inner circular row of magnets, middle circular row of magnets, and outer circular row of magnets is flanked by a magnet with an opposite pole; and
   wherein a position and proximity of each of the magnets in the field relay create a compressed woven magnetic field that reduces bleed off while channeling a peak strength to the armature plate and spins relative to the armature plate.

2. The system of claim 1, further comprising:
   a housing having:
      a top portion configured to support the field relay; and
      a bottom portion configured to support the armature plate;
   wherein the housing sandwiches the armature plate and the field relay together.

3. The system of claim 2, wherein the housing is composed of non-magnetic material.

4. The system of claim 1, wherein the inner circular row of magnets includes 12, 3/8×1/8 N42 magnets, the middle circular row of magnets includes 12, 5/8×18 N42 magnets, and the outer circular row of magnets includes has 12, 1 1/8×1/8 N42 Magnets.

5. The system of claim 1, further comprising:
   a motor engaged with the field relay, the motor configured to spin the field relay via one or more gears.

\* \* \* \* \*